United States Patent [19]

Mills

[11] Patent Number: 5,297,451
[45] Date of Patent: Mar. 29, 1994

[54] CAM TOOTH STARTER PINION

[75] Inventor: Floyd D. Mills, Valois, N.Y.

[73] Assignee: Ingersoll-Rand Company, Woodcliff Lake, N.J.

[21] Appl. No.: 991,047

[22] Filed: Dec. 15, 1992

[51] Int. Cl.$^5$ ............................................. F16H 55/06
[52] U.S. Cl. .................................... 74/462; 74/6; 74/457
[58] Field of Search ................... 74/6, 462, 457, 460

[56] References Cited

U.S. PATENT DOCUMENTS

| | | | |
|---|---|---|---|
| 1,185,931 | 6/1916 | Peters | 74/462 |
| 1,329,535 | 2/1920 | McGrath | 74/462 |
| 1,491,481 | 4/1924 | Huetter | 74/462 |
| 1,766,153 | 6/1930 | Trbojevich | 74/462 |
| 3,798,977 | 3/1974 | Digby | 74/6 |
| 4,932,273 | 6/1990 | Morishita et al. | 74/6 |

FOREIGN PATENT DOCUMENTS 991097  1/1983  U.S.S.R. ............................. 74/462

*Primary Examiner*—Leslie A. Braun
*Assistant Examiner*—David W. Laub
*Attorney, Agent, or Firm*—Walter C. Vliet

[57] ABSTRACT

A drive pinion for an engine starting motor having a lead-in chamfer of the starter pin defined by a geometry formed by rotating the radial gear tooth involute form through 90 degrees across the end of the tooth. The radius and axis of rotation are selected such that the cam surface is full across the height of the tooth and the cam surface intersects the back side of the tooth at the leading edge of the tooth.

2 Claims, 1 Drawing Sheet

CAM TOOTH STARTER PINION

BACKGROUND OF THE INVENTION

The drive pinion on an engine starting motor must extend and mesh with an engine ring gear prior to cranking. However, because of the flat shape of the face of the ring gear, the pinion and ring gear occasionally abut, thereby preventing the pinion from extending fully and engaging the ring gear. This is undesirable in all applications as it can cause damage to both the ring gear and the starter pinion and is especially critical in emergency starting applications. The problem is particularly enhanced when the starter pinion is moved into engagement with the flywheel or ring gear prior to rotation of the starter.

The foregoing illustrates limitations known to exist in present devices and methods. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention this is accomplished by providing a cam tooth starter pinion characterized by forming a lead-in chamfer formed by rotating the gear tooth involute form through 90 degrees across the end of the tooth.

The foregoing and other aspects will become apparent from the following detailed description of the invention when considered in conjunction with the accompanying drawing figures.

BRIEF DESCRIPTION OF THE DRAWING FIGURES

DETAILED DESCRIPTION

Figure 1:
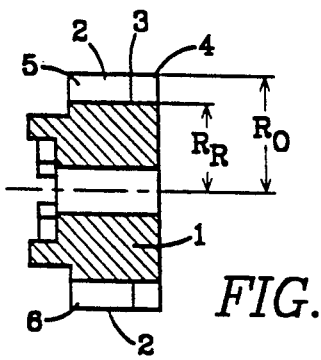
FIG. 1 is a cross section elevation view of an engine starter pinion according to the present invention taken at Section 1—1 of FIG. 2.

Referring to FIG. 1, the cross section of a typical starter pinion is shown having formed on the lead edge of the tooth a chamfer according to the present invention as will now be described.

Figure 2:
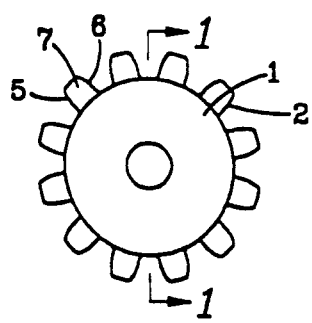
FIG. 2 is an end view of a starter pinion.

FIG. 2 is an end view of the pinion having the chamfer according to the present invention formed across the full leading edge of the pinion teeth.

Figure 3:
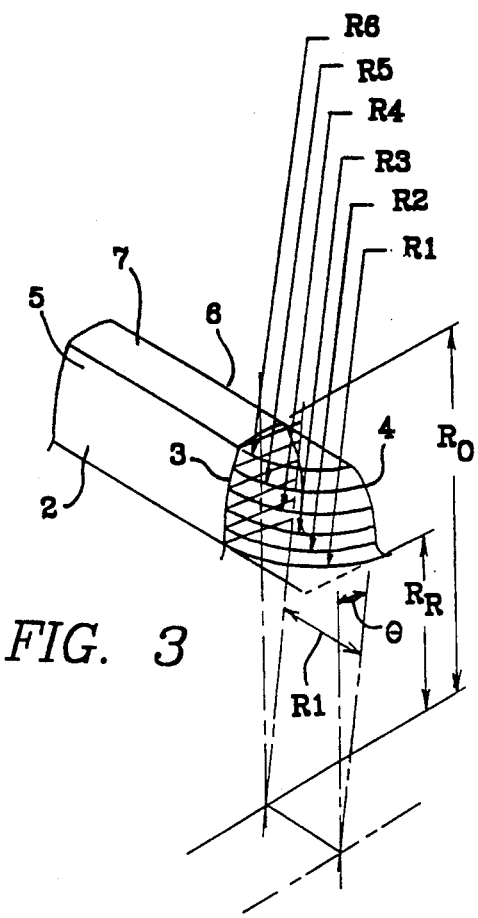
FIG. 3 shows an isometric view of a single pinion gear tooth showing the progressive generation of the involute according to the present invention.

According to the present invention, as best seen in FIG. 3, the chamfer across the leading edge of the tooth is formed by rotating the gear tooth involute form 3 of the tooth 2 from the driving side of the tooth 5 to the trailing side of the tooth 6 across the full face of the leading edge of the tooth through 90 degrees to the position indicated by reference numeral 4 forming the leading edge of the tooth.

Figure 4:
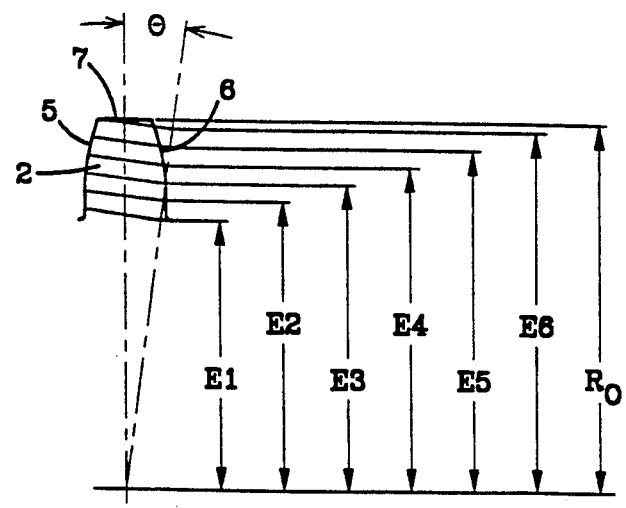
FIG. 4 is an end view of a single tooth showing the progressive generation of the involute according to the present invention.

According to the present invention, the involute is formed by swinging a progressively smaller radius from, the top of the tooth 7, i.e., the outside tooth radius $R_O$ to the tooth root radius $R_R$ example, R1 to R6, as shown in FIG. 3, from a conveniently offset centerline, for example, as shown in FIG. 4, by an angle theta from the radial centerline of the formed tooth at equally progressed elevations E1 through E6 as shown in FIG. 4. The chamfer thus formed substantially eliminates all flat spots which traditional chamfers on pinion faces do not eliminate. The elimination of flat spots allows the pinion according to the present invention to prevent nonengagements or abutments in substantially all cases.

It should be appreciated by one skilled in the art that the leading edge 4 form is the same involute as the pinion gear tooth form 3 rotated across the leading edge of the pinion tooth at a slightly downward pitch created by the offset angle theta.

What is claimed is:

1. A cam tooth starter pinion characterized by a lead-in chamfer formed on a cam tooth projecting in elevation from said pinion by rotating a gear tooth involute form of said cam tooth through 90 degrees across a lead engaging end of said cam tooth from a front driving side of said cam tooth to a back trailing side of said cam tooth and wherein a radius and axis of rotation at each tooth elevation are selected such that a lead-in cam surface is generated which is across the full face of said lead engaging end of the tooth and said cam surface intersects said back trailing side of said tooth at a first engaging edge of said lead engaging end of said cam tooth.

2. A lead-in chamfer of a starter pinion according to claim 1, wherein said axis of rotation is selected at an offset angle of between 5 and 15 degrees from radial centerline of the formed tooth in the same radial plane.

* * * * *